June 4, 1929.　　　C. W. KRESS　　　1,715,459
DISPLAY CABINET
Filed Aug. 4, 1928　　　2 Sheets-Sheet 1
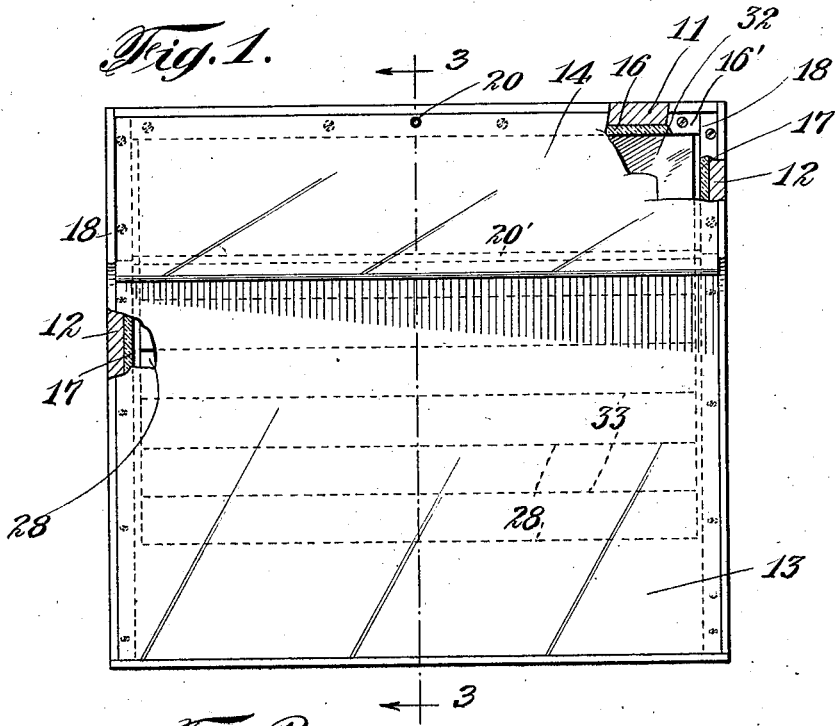
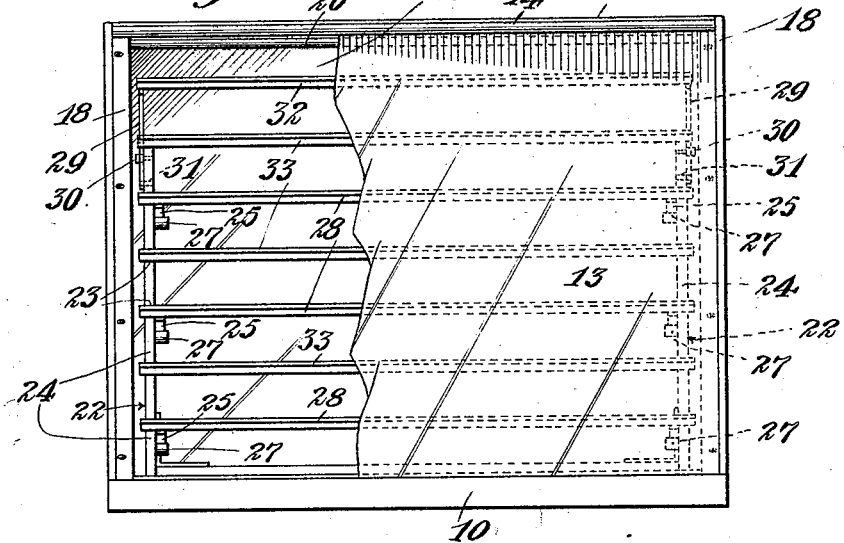
INVENTOR
Claude W. Kress
BY
his ATTORNEY June 4, 1929.   C. W. KRESS   1,715,459
DISPLAY CABINET
Filed Aug. 4, 1928   2 Sheets-Sheet 2
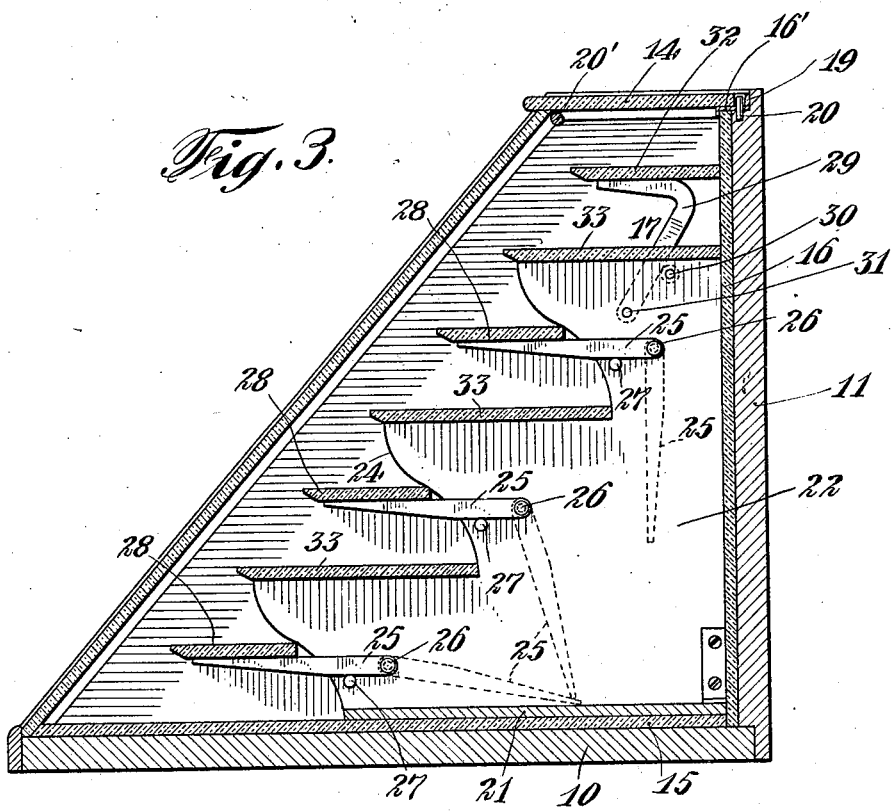
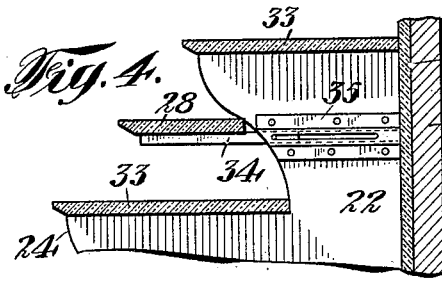
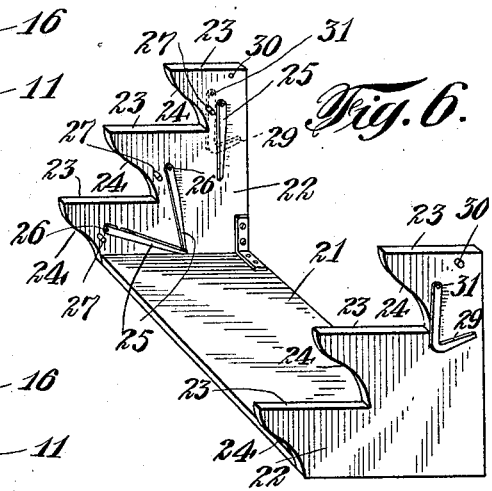
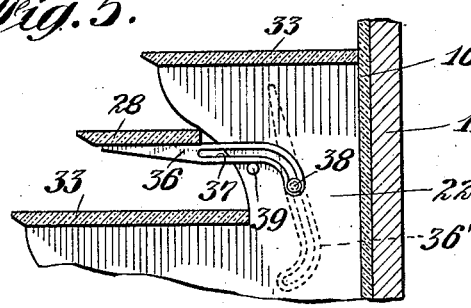
INVENTOR
Claude W. Kress
BY
ATTORNEY Patented June 4, 1929.

1,715,459

UNITED STATES PATENT OFFICE.

CLAUDE W. KRESS, OF NEW YORK, N. Y.

DISPLAY CABINET.

Application filed August 4, 1928. Serial No. 297,389.

My invention relates to display cabinets and refers particularly to cabinets having a plurality of changeable shelves.

It is frequently desirable to have display cabinets of such construction and arrangement of parts as to allow of a varying number of shelves therein.

As cabinets of this character are for the display of a number of commodities, it is desirable that they should be attractive, and hence, the position of the shelves should always be uniform with the shelves equi-distant from each other irrespective of the number of shelves employed.

This desirable attribute demands a device so constructed that the shelf supporting means may be readily changed to increase, or decrease, the number of shelves, the supporting means being so arranged as to hold the shelves in uniform position with respect to each other.

The device of my invention accomplishes all of the above, and other, desirable objects, as will be evident upon a consideration of my specification and accompanying drawings.

In the accompanying drawings illustrating modified forms of the device of my invention, similar parts are designated by similar numerals.

Figure 1 is a top view of one form of the device of my invention, partly broken away for purposes of clearness of description.

Figure 2 is a front view of the device of Figure 1.

Figure 3 is a section through the line 3—3 of Figure 1.

Figure 4 is a fragmentary view of a modified form of shelf support.

Figure 5 is a fragmentary view of a modified form of a shelf support.

Figure 6 is a perspective view of the shelf supporting frame of the device of Figures 1, 2 and 3.

The particular form of the device of my invention, illustrated in Figures 1, 2, 3 and 6 of the accompanying drawings, comprising a casing having the bottom 10, the back 11, the two sides 12, 12, the inclined glass front 13 and the glass top 14.

A mirror 15 rests upon the bottom 10, and lower portion of the mirror 16 rests upon the bottom 10 and the upper portion is supported by the channel member 16'.

Two side mirrors 17, 17 rests upon the bottom 10, the upper portion of each being supported by a channel member 18.

The glass top 14 rests within the recess 19 of the back 11, a pin 20 passing through the top 14 and into a hole within the back 11.

The top 14 also rests upon the rod 20' extending across the casing and supported by the two sides 12, 12.

The front 13 rests upon the rod 20'.

Within the casing is a shelf supporting frame comprising the bottom 21 and the two sides 22, 22 having a plurality of receding steps 23, 23, 23, the riser 24 of each step being curved downwardly and inwardly with respect to the next lower step.

The inward face of each riser carries a shelf support 25, pivotally attached at 26, and a stop-pin 27, the pivot 26 and the stop-pin 27 being so positioned that the shelf support 25 will support an auxiliary glass shelf 28 approximately mid-way between the steps 23, 23.

Exteriorly of each shelf-supporting side 22 is an angular shelf support 29 and a stop-pin 30, the support 29 being pivotally attached to the side 22 at 31. The support 29 serves to support the glass shelf 32.

Glass shelves 33, 33 rest upon the opposed steps 23, 23.

When the full shelf capacity of the casing is desired, the device is positioned as shown in Figure 3. When it is desired to reduce the number of shelves, the shelves 28, 28, 28 and 32 are removed and the shelf supports 25, 25, 25, 29 placed in the position shown in full lines in Figure 6 and in dotted lines in Figure 3.

It will be noted that both when the pivotal supports are employed and when they are not employed, the shelves are arranged harmoniously and equi-distant from each other.

The modified form of auxiliary shelf supports shown in Figure 4 comprises a sheet support 34, slidable within a run-way 35 carried by each side 22.

The modified form of auxiliary shelf supports, shown in Figure 5, comprises an angular shelf support 36 having an opening 37 therein. A pin 38, carried by the side 22, is slidable within the opening 37. Each side 22 carries also a stop pin 39.

By "removable shelf supports", I mean shelf supports so positioned and constructed that they may be placed in position to support shelves between the step shelves and may be removed from such position if desired.

The use and operation of my device are clearly illustrated in the accompanying drawings.

I do not limit myself to the particular size, shape, number, or arrangement, of parts, as shown and described, as these are given simply as a means for clearly describing the device of my invention.

What I claim is:

1. In a display cabinet, in combination, a casing, a shelf supporting member having a plurality of receding steps within the casing shelf upon each said step, a plurality of shelf supports intermediate of the steps and pivotally carried by the shelf supporting member, and a shelf upon each said pivotal support.

2. In a display cabinet, in combination, a casing, having a bottom, a back, two sides, a top and a glass front, a shelf supporting member having a bottom and two receding stepped sides, within the casing, a shelf upon each opposed pair of said steps, a plurality of auxiliary shelf supports pivotally carried by the shelf supporting member sides and a shelf carried by each said auxiliary support.

3. In a display cabinet, in combination, a casing having a bottom, a back, two sides, a top and a glass front, a shelf supporting member having a bottom and two receding stepped sides within the casing, a shelf upon each said step, a plurality of auxiliary shelf supports intermediate of the steps pivotally carried by the shelf supporting member sides and a shelf carried by each said auxiliary support.

4. In a display cabinet, in combination, a casing having a bottom, a back, two sides, a top and a glass front, a shelf supporting member having a bottom and two receding inwardly and downwardly curved stepped sides within the casing, a shelf upon each said step, a plurality of auxiliary shelf supports pivotally carried by the shelf supporting member sides and a shelf carried by each said auxiliary support.

Signed at New York city, in the county of New York and State of New York, this 2nd day of August, 1928.

CLAUDE W. KRESS.